(12) United States Patent
Wood et al.

(10) Patent No.: US 6,641,164 B2
(45) Date of Patent: Nov. 4, 2003

(54) HOLDER, SUCH AS A STROLLER ASSEMBLY, AND METHOD FOR ATTACHING AN INFANT SEAT

(75) Inventors: Timothy J. Wood, Wilmington, MA (US); Jesse A. Fourt, Palo Alto, CA (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 10/022,326

(22) Filed: Dec. 18, 2001

(65) Prior Publication Data

US 2002/0109320 A1 Aug. 15, 2002

Related U.S. Application Data

(60) Provisional application No. 60/268,800, filed on Feb. 14, 2001.

(51) Int. Cl.$^7$ ................................................ B62B 7/14
(52) U.S. Cl. ...................... 280/648; 280/30; 280/47.38; 297/256.16
(58) Field of Search ........................ 280/47.38, 33.993, 280/658, 87.051, 642, 47.35, 647, 648, 650, 30, 31; 297/256.15, 256.16, 250.1, 253

(56) References Cited

U.S. PATENT DOCUMENTS

| | | | |
|---|---|---|---|
| 4,570,956 A | | 2/1986 | Dyer |
| 4,836,573 A | | 6/1989 | Gebhard |
| 4,921,261 A | * | 5/1990 | Sadler, Jr. et al. ............ 280/30 |
| 4,946,180 A | | 8/1990 | Baer |
| 5,121,940 A | | 6/1992 | March |
| 5,188,380 A | | 2/1993 | Tucek |
| D345,720 S | | 4/1994 | Pohl |
| 5,676,386 A | | 10/1997 | Huang |
| 5,772,279 A | * | 6/1998 | Johnson, Jr. ................ 297/130 |
| 5,947,555 A | * | 9/1999 | Welsh, Jr. et al. .......... 297/130 |
| 6,070,890 A | | 6/2000 | Haut et al. |
| 6,155,592 A | | 12/2000 | Hsia |
| 6,286,844 B1 | * | 9/2001 | Cone, II et al. ......... 280/47.41 |
| 6,398,233 B1 | * | 6/2002 | Liang et al. ................. 280/30 |
| 6,409,205 B1 | * | 6/2002 | Bapst et al. ................ 280/642 |
| 6,478,327 B1 | * | 11/2002 | Hartenstine et al. ........ 280/642 |

* cited by examiner

Primary Examiner—Brian L. Johnson
Assistant Examiner—Brian L Swenson
(74) Attorney, Agent, or Firm—Taft, Stettinius & Hollister LLP

(57) ABSTRACT

An infant-seat holder, such as a stroller assembly, includes a frame having transversely-spaced-apart side members and includes a bumper bar having ends attached to the side members. A securing device releasably secures the infant seat to the frame. The securing device includes a first strap having a first end attached to the frame. A method removably attaches the infant seat to the infant-seat holder. An infant-seat holder is obtained having a bumper bar and a first strap. The infant seat is nested in the infant-seat holder against the bumper bar. The infant seat is releasably secured to the infant-seat holder using at least the first strap.

7 Claims, 5 Drawing Sheets

HOLDER, SUCH AS A STROLLER ASSEMBLY, AND METHOD FOR ATTACHING AN INFANT SEAT

CROSS REFERENCE TO RELATED APPLICATIONS

The present application claims priority of U.S. Provisional Application No. 60/268,800 filed Feb. 14, 2001, the entire disclosure of which is incorporated herein by reference.

BACKGROUND OF THE INVENTION

The present invention relates generally to holders, and methods for holding, infant seats, and more particularly to a holder, such as a stroller assembly, to which an infant seat may be removably attached and to a method for removably attaching an infant seat to a holder, such as a stroller assembly.

Infant seats are used alone when placed on a table or a floor. Some infant seats may be removably attached to a holder. Examples of holders include child car seats, vehicle seats, and strollers. Typically infant seats include a child harness, such as a three-point harness, to secure the infant in the infant seat. Each side of an infant seat designed for use in a vehicle has a belt-path guide near the foot-end of the infant seat to guide and retain the vehicle seat belt when securing the infant seat alone to the vehicle seat. Some infant seats designed for use in child car seats have, near the back of the seat bottom or the bottom of the seat back, a transversely-extending notch and an associated latch used to secure the infant seat to the child car seat.

In one conventional stroller, the stroller includes a thicker, generally "U"-shaped bumper bar whose ends are attached to the front of the top portion of the stroller armrests. When the stroller is to hold certain infant seats having the previously-described notch and latch, the thicker bar is replaced with a similar-shaped thinner rod. Then, the infant seat is snapped-on or clipped-on the rod by pulling the latch, placing the notch on the rod and releasing the latch. The stroller has stroller straps attached at the back of the top portion of the stroller armrests. The horizontal distance between the middle of the attachment and the rod is substantially 13 and ¾ inches. The stroller has a seat pad having a bight separating the seat-back portion from the seat-bottom portion of the seat pad, and the middle of the attachment is located between the bight and the rear of the stroller. The stroller straps are placed through the belt-path guide on the infant seat, and the stroller straps buckle together transversely midway between the armrests of the stroller. In another conventional stroller, not having a seat pad, several rods are included, with a specific rod being designed to be used for a specific infant seat.

What is needed is a holder, such as a stroller assembly, for an infant seat which provides a convenient attachment for an infant seat having or not having a notch used when the infant seat is installed in a child car seat. What also is needed is a convenient method for removably attaching an infant seat to a holder, such as a stroller assembly.

SUMMARY OF THE INVENTION

A first expression of an embodiment of the invention is for a stroller assembly having a stroller frame, a bumper bar, and a securing device. The stroller frame has a longitudinal axis and transversely-spaced-apart first and second side members. The bumper bar has a first end attached to the first side member and has a second end attached to the second side member. The securing device is for releasably securing an infant seat, having a belt-path guide, to the stroller. The securing device includes a first strap having a first end attached to the stroller frame. When the infant seat is secured, the first strap is spaced apart from the belt-path guide and longitudinally positioned between the belt-path guide and the bumper bar.

A second expression of an embodiment of the invention is for a stroller assembly having a stroller frame, a bumper bar, and a securing device. The stroller frame has a longitudinal axis and transversely-spaced-apart first and second side members. The bumper bar has a first end attached to the first side member and has a second end attached to the second side member. The securing device is for releasably securing an infant seat to the stroller frame. The securing device includes a first strap having a first end attached to the stroller frame. The bumper bar and the middle of the first end are separated by a horizontal distance between generally nine inches and generally thirteen inches.

A third expression of an embodiment of the invention is for a stroller assembly having a stroller frame, a seat pad, a bumper bar, and a securing device. The stroller frame has a longitudinal axis and transversely-spaced-apart first and second side members. The seat pad is supported by the stroller frame and has a seat-bottom portion, a seat-back portion, and a bight separating the seat-bottom portion from the seat-back portion. The bumper bar has a first end attached to the first side member and has a second end attached to the second side member. The securing device is for releasably securing an infant seat to the stroller frame. The securing device includes a first strap having a first end attached to the stroller frame. The middle of the first end is located longitudinally between the bight and the bumper bar.

A fourth expression of an embodiment of the invention is for a stroller assembly having a stroller frame, a seat sling, a seat pad, a bumper bar, and a securing device. The stroller frame has a longitudinal axis and transversely-spaced-apart first and second side members. The seat sling is supported by the stroller frame. The seat pad is supported by the seat sling and has a seat-bottom portion. The bumper bar has a first end attached to the first side member and has a second end attached to the second side member. The securing device is for releasably securing an infant seat to the stroller frame. The securing device includes a first strap having a first end attached to the stroller frame. The first strap is substantially-completely storable under the seat-bottom portion of the seat pad between the seat pad and the seat sling.

Four alternate expressions of an embodiment of the invention are for infant-seat holders (such as, without limitation, high chairs, swings, and stroller assemblies) and correspond to the previously-described four expressions wherein the terminology "stroller assembly" of a previous expression is replaced with "infant-seat holder" and wherein the terminology "stroller frame" is replaced with "frame".

A method of the invention is for removably attaching an infant seat to a stroller and includes steps a) through c). Step a) includes obtaining a stroller having a bumper bar and a first strap. Step b) includes nesting the infant seat in the stroller against the bumper bar. Step c) includes releasably securing the infant seat to the stroller using at least the first strap.

An alternate method of the invention is for removably attaching an infant seat to an infant-seat holder (such as, without limitation, a high chair, a swing, and a stroller assembly) and corresponds to the previously-described method wherein the term "stroller" of the previous method is replaced with "infant-seat holder" and wherein the terminology "stroller frame" is replaced with "frame".

Several benefits and advantages are derived from the invention. In the first three expressions and alternate expressions, the stroller assembly or generalized infant-seat holder provides for a removable attachment of an infant seat to the stroller assembly or generalized infant-seat holder whether or not the infant seat has a notch, wherein the attachment is accomplished conveniently without having to clip a notch of the infant seat onto a bumper bar and without having to thread a strap into a belt-path guide on the infant seat. In the fourth expression and alternate expression, the stroller assembly or generalized infant-seat holder provides for a removable attachment of an infant seat to the stroller assembly or generalized infant-seat holder, wherein the first strap is substantially-completely storable under the seat-bottom portion of the seat pad which provides convenience when the stroller or generalized infant-seat holder is being occupied by an older child who does not require placement in an infant seat. In the method and alternate method, an infant seat is removably attached to a stroller or generalized infant-seat holder by conveniently nesting the infant seat in the stroller, or generalized infant-seat holder, against the bumper bar whether or not the infant seat has a notch and without having to clip a notch of the infant seat onto a bumper bar.

DETAILED DESCRIPTION

Figure 1:
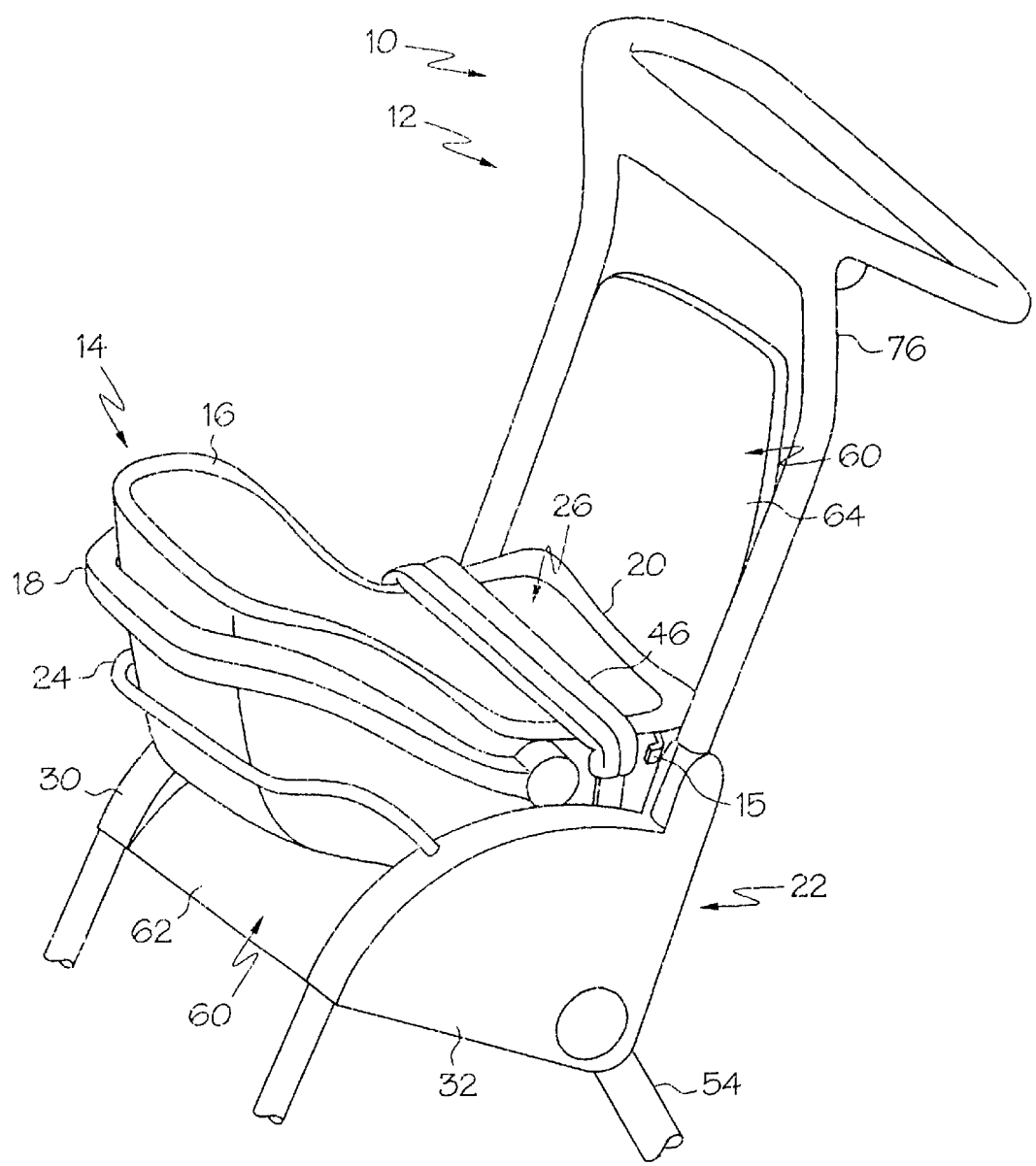
FIG. 1 is a schematic, perspective view a first stroller-assembly embodiment of the infant-seat holder of the invention together with an infant seat nested in, and removably attached to, the stroller assembly.
Figure 2:
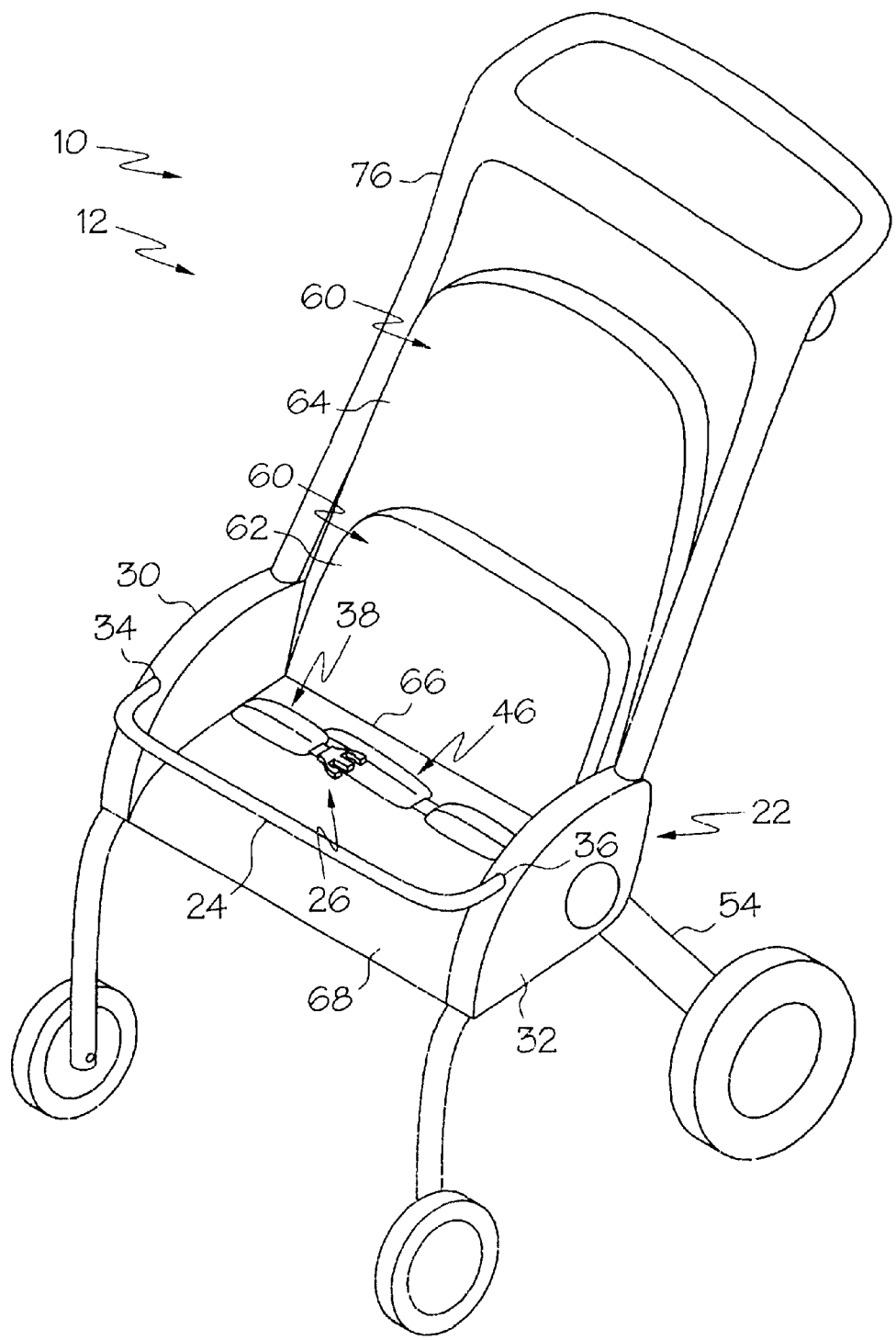
FIG. 2 is a schematic, perspective view of the stroller-assembly of FIG. 1 with the infant seat removed and with the seat-bottom portion of the seat pad lifted up showing the first and second straps stored between the seat sling and the seat-bottom portion of the seat pad.
Figure 3:
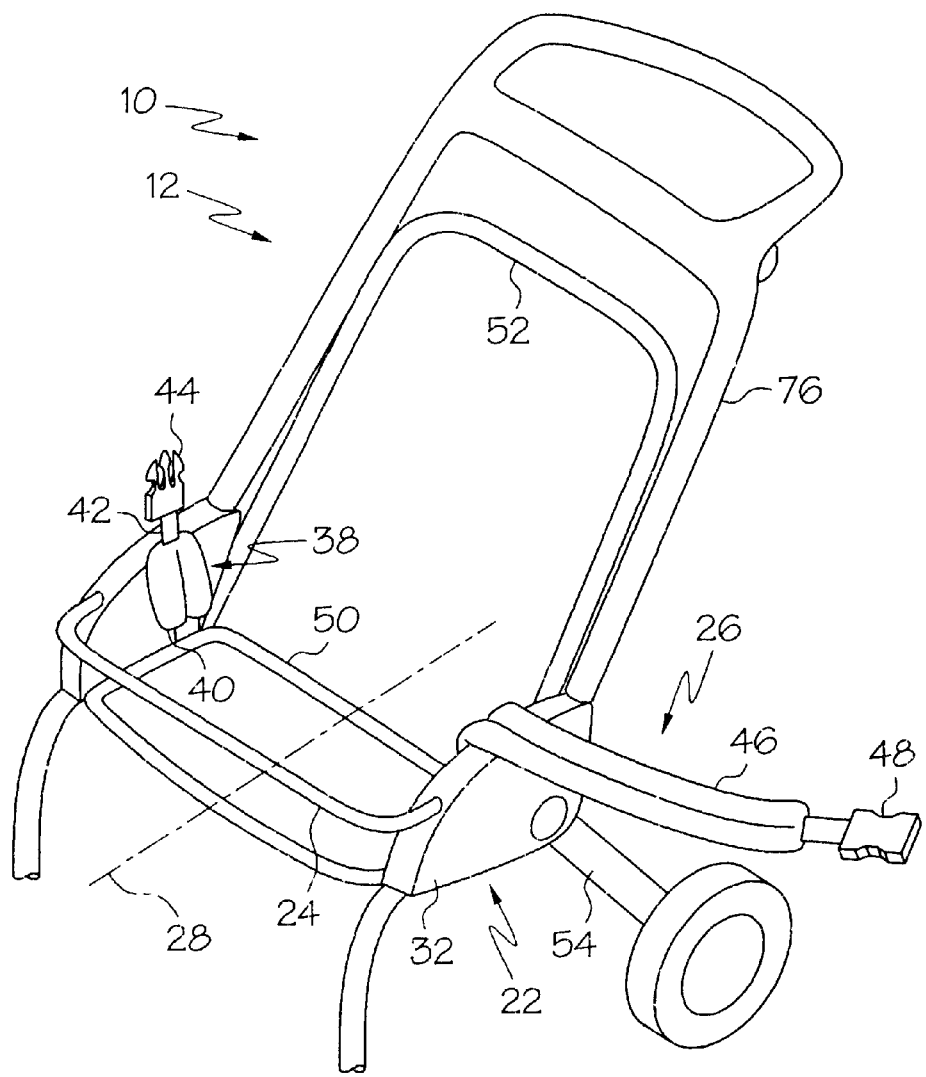
FIG. 3 is a schematic, perspective view of the stroller assembly of FIG. 2, with the seat pad and seat sling removed to expose the attachment of the first end of the first strap to the seat-bottom tube.
Figure 4:
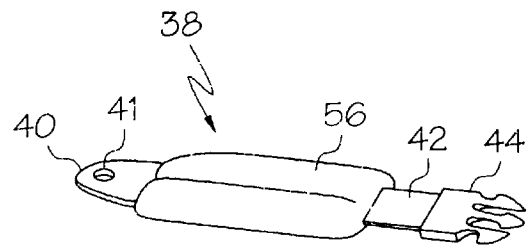
FIG. 4 is a perspective view of the first strap removed from the stroller assembly of FIG. 3.
Figure 5:
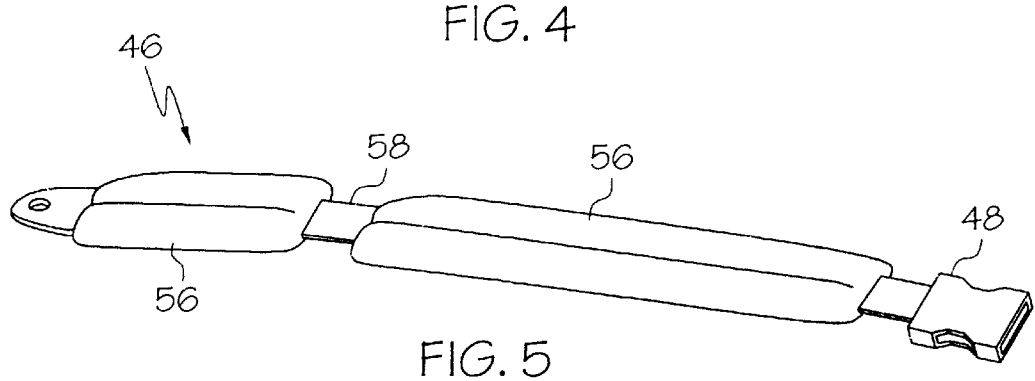
FIG. 5 is a perspective view of the second strap removed from the stroller assembly of FIG. 3.

A first embodiment of the infant-seat holder 10 of the invention is a first embodiment of a stroller assembly 12 shown in FIGS. 1–5, wherein FIG. 1 also shows a first embodiment of an infant seat 14 removably attached to the stroller assembly 12. The infant seat 14 includes a shell 16, usually includes cushioning (omitted from the figures for clarity), and typically includes a carrying handle 18 attached (such as rotatably attached) to the shell 16. Some infant seats 14 are designed to be installed on a vehicle seat (not shown) through use of the vehicle seat belts (not shown) engaged in three-sided belt guides 15. The belt guides 15 are located on the sides of the shell 14 near the foot end 20 (i.e., the end closest to the infant's feet) of the shell 14. Some infant seats 14 have a transverse notch and a latch (both not shown in the figures) for attachment of the infant seat to a child car seat (not shown).

In a first expression of a first embodiment of the stroller assembly 12 shown in FIGS. 1–5, the stroller assembly 12 includes a stroller frame 22, a bumper bar 24, and securing means 26. The stroller frame 22 has a longitudinal axis 28 and transversely-spaced-apart first and second side members 30 and 32. The bumper bar 24 has a first end 34 attached to the first side member 30 and has a second end 36 attached to the second side member 32. A bumper bar 24 of a stroller assembly 12 is a bar which extends over and across an older child's legs or lap when an older child is seated in the stroller assembly 12 when the infant seat 14 has been removed from the stroller assembly 12. The securing means 26 is means for releasably securing an infant seat 14, having a belt-path guide 15, to the stroller frame 22, wherein the securing means 26 includes a first strap 38 having a first end 40 attached to the stroller frame 22, and wherein, when the infant seat 14 is secured, the first strap 38 is spaced apart from the belt-path guide 15 and longitudinally disposed between the belt-path guide 15 and the bumper bar 24.

In a second expression of a first embodiment of the stroller assembly 12 shown in FIGS. 1–5, the stroller assembly 12 includes a stroller frame 22, a bumper bar 24, and securing means 26. The stroller frame 22 has a longitudinal axis 28 and transversely-spaced-apart first and second side members 30 and 32. The bumper bar 24 has a first end 34 attached to the first side member 30 and has a second end 36 attached to the second side member 32. The securing means 26 is means for releasably securing an infant seat 14 to the stroller frame 22, wherein the securing means 26 includes a first strap 38 having a first end 40 attached to the stroller frame 22, wherein the bumper bar 24 and the middle of the first end 40 are separated by a horizontal distance between generally nine inches and generally thirteen inches. By "horizontal distance" is meant a horizontal distance when the stroller assembly 12 is in its use orientation on a horizontal surface. By "middle" of the first end 40 is meant middle of the width of the first end, wherein the first strap 38 has a length, a width (which may vary along the length), and a thickness (which may vary along the length). Applicants conducted stability tests which showed that this range of horizontal distances provided a secure attachment of the infant seat 14 to the stroller assembly 12 when the stroller assembly 12 was inverted by 360 degrees with the attached infant seat 14. Longer distances caused the infant seat 14 to detach from the stroller assembly 12. Smaller distances would interfere with the handle 18 of the infant seat 14. In one design, the horizontal distance separating the bumper bar 24 and the middle of the first end 40 is substantially ten and one-half inches.

In a third expression of a first embodiment of the stroller assembly 12 shown in FIGS. 1–5, the stroller assembly 12 includes a stroller frame 22, a seat pad 60, a bumper bar 24, and securing means 26. The stroller frame 22 has a longitudinal axis 28 and transversely-spaced-apart first and second side members 30 and 32. The seat pad 60 is supported by the stroller frame 22 and has a seat-bottom portion 62, a seat-back portion 64, and a bight 66 (seen from the underside in FIG. 2) separating the seat-bottom portion 62 form the seat-back portion 64. The bumper bar 24 has a first end 34 attached to the first side member 30 and has a second end 36 attached to the second side member 32. The securing means 26 is means for releasably securing an infant seat 14 to the stroller frame 22, wherein the securing means 26 includes a first strap 38 having a first end 40 attached to the stroller frame 22, wherein the middle of the first end 40 is disposed longitudinally between the bight 66 and the bumper bar 34. Applicant conducted stability tests which showed that this arrangement provided a secure attachment of the infant seat 14 to the stroller assembly 12 when the stroller assembly 12 was inverted by 360 degrees with the attached infant seat 14. Having the bight 66 located longitudinally between the middle of the first end 40 and the bumper bar 24 caused the infant seat 14 to detach from the stroller assembly 12. In one design, the middle of the first end 40 of the first strap 38 is disposed within generally three inches of the bight 66.

In a fourth expression of a first embodiment of the stroller assembly 12 shown in FIGS. 1–5, the stroller assembly 12 includes a stroller frame 22, a seat sling 68, a seat pad 60, a bumper bar 24, and securing means 26. The stroller frame 22 has a longitudinal axis 28 and transversely-spaced-apart first and second side members 30 and 32. The seat sling 68 is supported by the stroller frame 22. The seat pad 60 is supported by the seat sling 68 and has a seat-bottom portion 62. The bumper bar 24 has a first end 34 attached to the first side member 30 and has a second end 36 attached to the second side member 32. The securing means 26 is means for releasably securing an infant seat 14 to the stroller frame 22, wherein the securing means 26 includes a first strap 38 having a first end 40 attached to the stroller frame 22, and wherein the first strap is substantially-completely storable under the seat-bottom portion 62 of the seat pad 60 between the seat pad 60 and the seat sling 68.

In one example of the fourth expression, the seat pad 60 includes a seatback portion 64 and a bight 66 separating the seat-bottom portion 62 from the seat-back portion 64, and the middle of the first end 40 of the first strap 38 is disposed longitudinally between the bight 66 and the bumper bar 24. In the same or another example, the bumper bar 24 and the middle of the first end 40 of the first strap 38 are separated by a horizontal distance between generally nine and generally thirteen inches.

In one model of any of the previous expressions, the bumper bar 24 is a rod, such as, but not limited to, a detachable metal rod. In one modification, the rod is adapted to receive a detachable child tray (not shown). In one variation, not shown, the child tray includes at least one recess to hold toys, food, and/or drink. In another model, not shown, the bumper bar is a child tray. In an additional model, not shown, the bumper bar is a thicker bar than shown in the figures.

In one example of any of the previous expressions, the first strap 38 has a grommet 41 proximate the first end 40, and a rivet (not shown) passes through the grommet 41 to secure the first end 40 to the stroller frame 22. In another example, not shown, the first end 40 has a loop which surrounds a portion of the stroller frame 22. In an additional example, not shown, the first end 40 is secured between two clamping portions of the stroller frame 22.

In one variation of any of the previous expressions, the first and second side members 30 and 32 are first and second stroller armrests, wherein the stroller frame 22 includes a seat-bottom tube 50, and wherein the first end 40 of the first strap 38 is attached to the seat-bottom tube 50. In another modification, not shown, the first end 40 is attached to the seat-back tube 52 of the stroller frame 22. In another modification, not shown, the first end 40 is attached to a rear leg 54 of the stroller frame 22. In another variation, not shown, the first end 40 of the first strap 38 is attached to the first side member 30. In one modification, not shown, the first side member 30 is a first stroller armrest, and the first end 40 is attached to the first stroller armrest.

In one design of any of the previous expressions, the first strap 38 has a second end 42 having a fastener 44, the securing means 26 also includes a second strap 46 having a first end attached to the stroller frame 22 and having a second end having a fastener 48, and wherein the fasteners 44 and 48 are releasably engageable with each other and wherein the fastened strap length is adjustable (such adjustment omitted from the figures for clarity). When a strap is described as having an end having a fastener, it is to be understood that some fasteners allow the end to be pulled through the fastener to tighten the strap. In one variation, the engagement is proximate the first side member 30 keeping the fasteners 44 and 48 away from the infant. In another variation, not shown, the engagement is midway between the first and second side members 30 and 32. In another design, not shown in FIGS. 1–5 and to be more fully discussed later, the securing means 26 includes the first strap (but not the second strap), wherein the first strap is long enough to encircle the infant seat 14, and wherein the fastener of the second end of the first strap engages a slot in the top of a stroller armrest. In a further design, not shown, the second end 42 of the first strap 38 lacks a fastener 44 but is releasably engageable with the fastener 48 of the second end of the second strap 46 or is releasably engageable with a fastener secured to the second side member 32, as can be appreciated by the artisan.

In one construction of any of the previous expressions, the first strap 38 and, when present, the second strap 40 include thick padded strap portions 56 which are too stiff to form a loop. In one modification, the padded strap portions 56 are too thick to be placed in the belt-path guide 15 of the infant seat 14. In one variation, the second strap 40 is longer than the first strap 38 and has a fabric hinge 58 separating two padded strap portions 56. In another construction, not shown, web portions replace the padded strap portions 56. Other strap constructions are left to the artisan.

Figure 7:
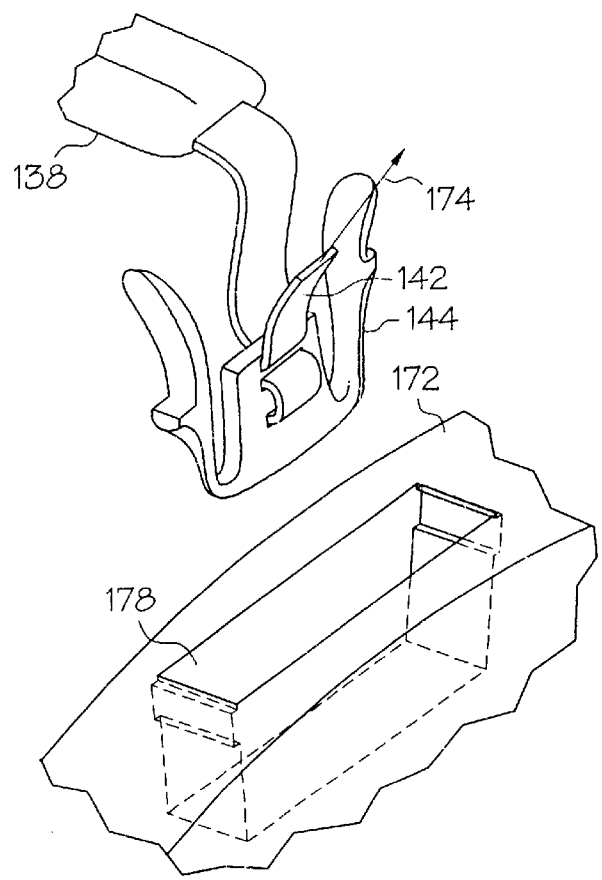
FIG. 7 is an enlarged view of a portion of the stroller assembly of FIG. 6 showing the second end of the first strap about to be releasably secured in a slot on the top of the stroller armrest.
Figure 6:
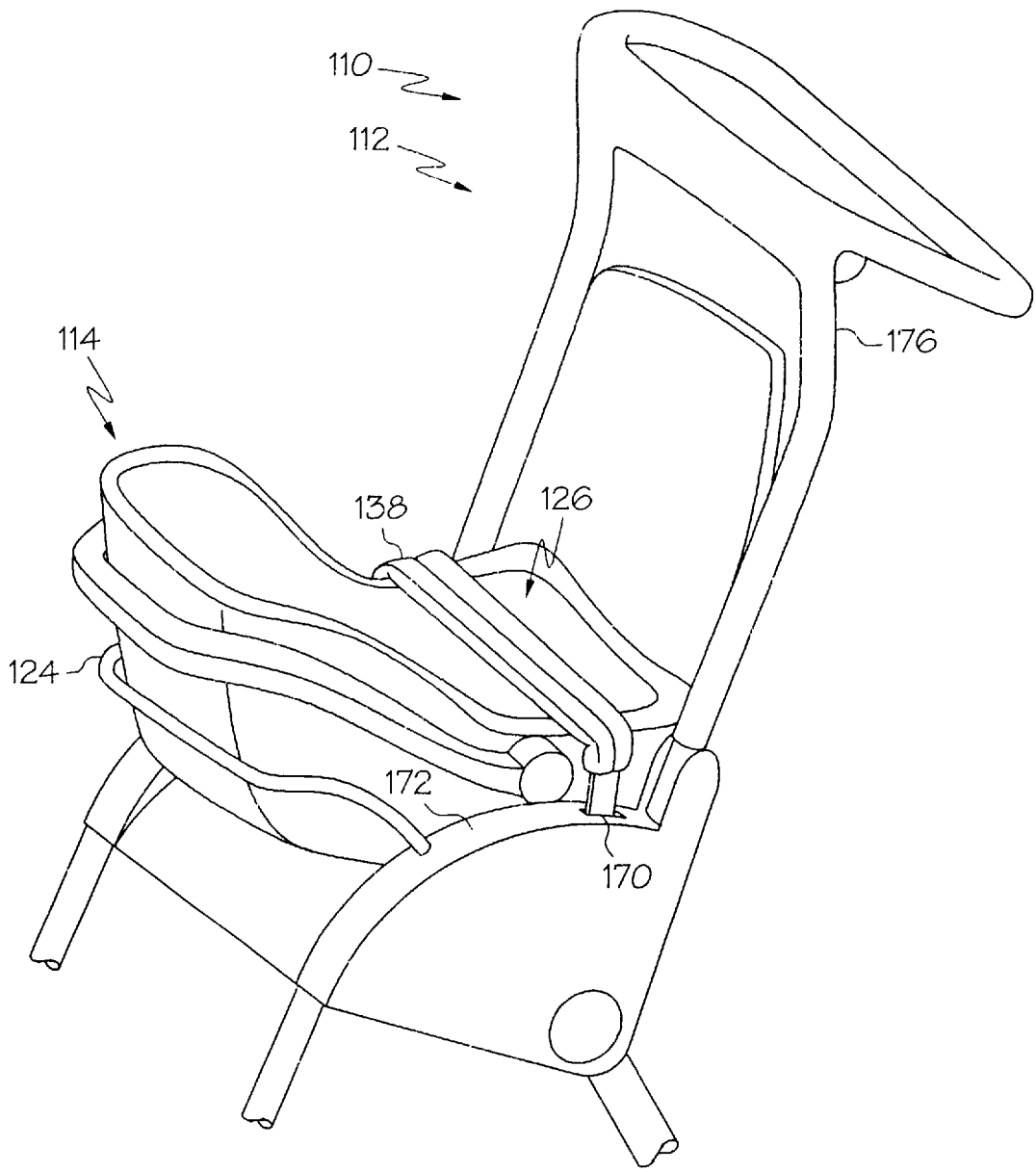
FIG. 6 is a schematic, perspective view of a second stroller-assembly embodiment of the infant-seat holder of the invention together with an infant seat nested in, and removably attached to, the stroller assembly, wherein the second stroller-assembly embodiment has a first strap but no second strap.

As previously mentioned, the infant-seat holder 10 is not limited to a stroller assembly 12 and non-limiting other examples of infant-seat holders include high chairs and swings. Alternate expressions of the infant-seat holder 10 are identical to the previously-described four expressions of the first embodiment of the stroller assembly 12, wherein the terminology "stroller assembly" of a previous expression is replaced with "infant-seat holder", and wherein the terminology "stroller frame" is replaced with "frame". It is noted that a bumper bar of an infant-seat holder 10 is a bar which extends over and across an older child's legs or lap when an older child is seated in the infant-seat holder when the infant seat has been removed from the infant-seat-holder. In one example, the bumper bar of a high chair is a feeding tray or a bar to which a feeding tray is attached. In another example, the bumper bar is a front restraining bar on a swing. A second embodiment of the stroller assembly 112 is shown in FIGS. 6 and 7. Stroller assembly 112 is substantially identical to previously-described stroller assembly 12 except for the securing means 126 and the attachment of the fastener 144 of the first strap 138. Securing means 126 includes the first strap 138 which is long enough to encircle the infant seat 114, wherein the fastener 144 of the second end 142 of the first strap 138 engages a slot 170 in the top of the second stroller armrest 172. Arrow 174 indicates the direction that the second end 142 of the first strap 138 is pulled to tighten the removable attachment of the first strap 138. Securing means 126 does not include a second strap as does securing means 26.

A method of the invention is for removably attaching an infant seat 14 and 114 to a stroller (only a stroller assembly 12 and 112 of which is shown in the figures). The method includes steps a) through c). Step a) includes obtaining a stroller having a bumper bar 24 and 124 and a first strap 38 and 138. Step b) includes nesting the infant seat 14 and 114 in the stroller against the bumper bar. Step c) includes securing the infant seat to the stroller using at least the first strap. In one implementation, the infant seat is placed on the seat-bottom portion of the seat pad and also contacts both the bumper bar and the seat-back portion of the seat pad. In another implementation, the stroller has no seat pad or seat sling, and can only be used with an attached infant seat. In either implementation, nesting support by the stroller for the infant seat is provided by the bumper bar and one or more stroller frame components such as, without limitation, the first and second side members 30 and 32, the seat-bottom tube 50, the seat-back tube 52, and the push handle 76 and 176.

In one example of the method, when the infant seat 14 and 114 has a transversely-extending notch (not shown) used when the infant seat is attached to a child car seat, step b) nests the infant seat in the stroller against the bumper bar with the bumper bar disposed outside the notch.

As previously mentioned, the method of removably attaching an infant seat 14 and 114 to an infant-seat holder 10 and 110 is not limited to infant-seat holders which are strollers, and non-limiting other examples of infant-seat holders include high chairs and swings. An alternate method is identical to the previously-described method, wherein the term "stroller" of the previous method is replaced with "infant-seat holder". It is noted that a bumper bar of an infant-seat holder 10 is a bar which extends over and across an older child's legs or lap when an older child is seated in the infant-seat holder when the infant seat has been removed from the infant-seat-holder. In one example, the bumper bar of a high chair is a feeding tray or a bar to which a feeding tray is attached. In another example, the bumper bar is a front restraining bar on a swing.

Several benefits and advantages are derived from the invention. In the first three expressions and alternate expressions, the stroller assembly or generalized infant-seat holder provides for a removable attachment of an infant seat to the stroller assembly or generalized infant-seat holder whether or not the infant seat has a notch, wherein the attachment is accomplished conveniently without having to clip a notch of the infant seat onto a bumper bar and without having to thread a strap into a belt-path guide on the infant seat. In the fourth expression and alternate expression, the stroller assembly or generalized infant-seat holder provides for a removable attachment of an infant seat to the stroller assembly or generalized infant-seat holder, wherein the first strap is substantially-completely storable under the seat-bottom portion of the seat pad which provides convenience when the stroller or generalized infant-seat holder is being occupied by an older child who does not require placement in an infant seat. In the method and alternate method, an infant seat is removably attached to a stroller or generalized infant-seat holder by conveniently nesting the infant seat in the stroller, or generalized infant-seat holder, against the bumper bar whether or not the infant seat has a notch and without having to clip a notch of the infant seat onto a bumper bar.

The foregoing description of several methods and expressions of embodiments of the invention has been presented for purposes of illustration. It is not intended to be exhaustive or to limit the invention to the precise forms and procedures disclosed, and obviously many modifications and variations are possible in light of the above teaching. It is intended that the scope of the invention be defined by the claims appended hereto.

What is claimed is:

1. An infant-seat holder comprising:
   a) a frame having a longitudinal axis and transversely-spaced-apart first and second side members;
   b) a seat sling supported by the frame;
   c) a seat pad supported by the seat sling and having a seat-bottom portion;
   d) a bumper bar having a first end attached to the first side member and having a second end attached to the second side member; and
   e) means for releasably securing an infant seat to the frame, wherein the securing means includes a first strap having a first end attached to the frame, wherein the first strap is substantially storable under the seat-bottom portion of the seat pad between the seat pad and the seat sling.

2. A stroller assembly comprising:
   a) a stroller frame having a longitudinal axis and transversely-spaced-apart first and second side members;
   b) a seat sling supported by the stroller frame;
   c) a seat pad supported by the seat sling and having a seat-bottom portion;
   d) a bumper bar having a first end attached to the first side member and having a second end attached to the second side member; and
   e) means for releasably securing an infant seat to the stroller frame, wherein the securing means includes a first strap having a first end attached to the stroller frame, wherein the first strap is substantially storable under the seat-bottom portion of the seat pad between the seat pad and the seat sling.

3. The stroller assembly of claim 2, wherein the first and second side members are first and second stroller armrests, wherein the stroller frame includes a seat-bottom tube, and wherein the first end of the first strap is attached to the seat-bottom tube.

4. The stroller assembly of claim 3, wherein the seat pad includes a seat-back portion and a bight separating the seat-bottom portion from the seat-back portion, and wherein the middle of the first end of the first strap is disposed longitudinally between the bight and the bumper bar.

5. The stroller assembly of claim 3, wherein the bumper bar and the middle of the first end of the first strap are separated by a horizontal distance between generally nine and generally thirteen inches.

6. The stroller assembly of claim 2, wherein the seat pad includes a seat-back portion and a bight separating the seat-bottom portion from the seat-back portion, and wherein the middle of the first end of the first strap is disposed longitudinally between the bight and the bumper bar.

7. The stroller assembly of claim 2, wherein the bumper bar and the middle of the first end of the first strap are separated by a horizontal distance between generally nine and generally thirteen inches.

* * * * *